United States Patent [19]

Takahashi

[11] Patent Number: 5,259,100
[45] Date of Patent: Nov. 9, 1993

[54] MILLING TOOL FOR TURRET PUNCH PRESS

[75] Inventor: Yutaka Takahashi, Placentia, Calif.

[73] Assignee: Amada Engineering & Service Co., Inc., LaMirada, Calif.

[21] Appl. No.: 888,794

[22] Filed: May 27, 1992

[51] Int. Cl.$^5$ .................. B23P 23/04; B23B 39/10; B26D 5/02

[52] U.S. Cl. .................. 29/33 J; 29/40; 29/560; 83/552; 408/20; 408/130

[58] Field of Search .............. 29/560, 33 J, 57, 40; 483/24, 28, 29; 83/571, 552; 408/130, 124, 131, 20, 35

[56] References Cited

U.S. PATENT DOCUMENTS

| | | | |
|---|---|---|---|
| 3,617,141 | 11/1971 | Sullivan | 408/35 |
| 3,788,760 | 1/1974 | Daniels | 408/130 |
| 3,797,955 | 3/1974 | Peddinghaus et al. | 408/20 |
| 3,803,927 | 4/1974 | Lawler | 74/89.15 |
| 4,012,161 | 3/1977 | Shultz | 408 1 R/ |
| 4,037,982 | 7/1977 | Clement | 408/61 |
| 4,090,281 | 5/1978 | Hautau | 29/40 |
| 4,244,669 | 1/1981 | Puritz et al. | 409/137 |
| 4,412,469 | 11/1983 | Hirata et al. | 83/552 |
| 4,473,330 | 9/1984 | Chalier | 408/98 |
| 4,515,505 | 5/1985 | Frisbie et al. | 409/163 |
| 4,532,845 | 8/1985 | Jinnouchi | 83/552 |
| 4,658,688 | 4/1987 | Shah et al. | 408/20 |
| 4,761,100 | 8/1988 | Maillard | 29/560 |
| 4,977,804 | 9/1990 | Naito | 83/76.7 |
| 5,001,827 | 3/1991 | Nakagawa | 29/560 |
| 5,016,335 | 5/1991 | Becker et al. | 29/57 |
| 5,033,917 | 7/1991 | McGlasson et al. | 408/67 |
| 5,044,239 | 9/1991 | Endo et al. | 83/133 |
| 5,056,964 | 10/1991 | Naka et al. | 408/35 |

FOREIGN PATENT DOCUMENTS

61-123 4/1985 Japan .................. 83/552
1380872 3/1988 U.S.S.R. .................. 408/130

*Primary Examiner*—William Briggs

[57] ABSTRACT

An air powered milling tool supported in the upper turret of a turret punch press is cycled simultaneously with a hydraulically- or mechanically-powered punch press ram in a multiple-stage cycle to perform a milling operation on a sheet material workpiece retained between the upper and lower turrets of the punch press. The air-powered tool, which includes a punch head in coaxial alignment with a guide sleeve, drives an end mill which is contained within and is coaxially extendible through the guide sleeve toward the workpiece to perform a machining operation thereon. Hold-down bearings disposed at the end of the guide sleeve engage with the workpiece at a local region thereof. A spring-biased lifter disposed in the upper turret is engagable with the guide sleeve. In operation, the punch press striker impacts the punch head of the milling tool, urging the milling tool and air motor in the direction of the sheet material. As the tool descends, the milling tool extends from the guide sleeve and impacts the sheet material. Simultaneously, a compressed air charge or steady state air flow is flowed through the striker and into the milling tool body and is delivered to the air motor which drives the milling tool in the desired machining operation. Subsequent to the completed machining operation, the striker is reciprocated to its idle position, thereby enabling the lifter and the hold-down spring to return the punch head and guide sleeve, respectively, to their initial idle positions. Overall system operation is computer controlled.

46 Claims, 3 Drawing Sheets

MILLING TOOL FOR TURRET PUNCH PRESS

FIELD OF THE INVENTION

This invention relates generally to punch presses used for machining sheet material, and more particularly to a milling tool which is carried by the turret of a punch press for milling sheet metal work pieces.

BACKGROUND OF THE INVENTION

Punch presses having rotatable upper and lower turrets are well known in the machine tool art. The upper turret carries a plurality of punch tools of various sizes and shapes, while the lower turret carries a plurality of dies which correspond to the tools carried by the upper turret. Rotation of the turrets under control of a CNC brings a selected pair of tools and dies into registry under the ram of the punch press. Various machining operations are performed by these tools including punch shaping, shearing, through-hole punching, and nibbling operations, among others.

Turret punch presses are typically employed in high volume, high speed manufacturing systems including those systems used for performing the above-described machining operations and for manufacturing sheet metal components from metal sheet stock. The punches which are carried by the turrets of these machines are generally driven by hydraulically- or mechanically-operated rams. Initially, a sheet workpiece is placed on the work table of the turret press and a selected punch, which is supported and manipulated by the turret, is delivered into a generally vertical position over the workpiece and underlying die. A striker driven by the ram imparts a sharp blow to one end of the punch, causing the shaped opposite end of the punch to rapidly and forcefully impact the sheet material, thereby punching a hole or creating a shaped contour in the sheet material having a desired configuration roughly corresponding to the configuration of the shaped punch end.

Common to the punching process, however, are a number of well known problems associated with the punching process which may compromise the integrity of the resulting punched hole or contour in the sheet material. For example, micro-cracks formed at the periphery of the punched hole may propagate into the surrounding sheet material when subjected to fatigue loading caused by subsequent machining operations or after assembly in a finished product. It is known that these micro-cracks when exposed to fatigue loading may grow and extend even further into the sheet material, further compromising the structural integrity of the component and the assembly in which it is incorporated. One approach to alleviating this punching problem is the use of a router to shape the periphery of the punched hole or contour or to machine away the micro-cracked periphery thereof.

Another well known punching problem is slug blow-out caused during punching, resulting in a generally ragged hole having an taper increasing in diameter through the sheet material in the direction of the initial stroke of the punch. The punched hole, which is partially formed by a shear mechanism, cannot be used for close tolerance applications due to non-uniform through-hole variations and center-to-center variations between punched holes. One current solution to this problem is reaming or drilling the punched hole as necessary to remove the ragged inner diameter of the hole, thereby creating a uniform inner diameter through the thickness of the sheet material.

A further problem with current punching processes, and especially for orthogonal shearing processes, is deviation in sheet edge linearity which is a cause of inaccurate bending as a result of imprecise backgaging (i.e., orientation of the sheet on the X-axis). Yet another problem associated with punching is a resulting punched contour having a rough, scallop-like edge which may also detrimentally affect hole dimensioning and center-to-center accuracy relative to adjacent punched contours in the punched component and adjacent components of the resulting assembly.

Various secondary operations are commonly employed to remedy these punching problems including filing or grinding of sheet edges after punching, reaming or drilling of resulting punched holes, or filing or grinding of the punched holes or contours. These secondary machining operations are frequently used in the precision sheet metal and aerospace industries as necessary to accomplish precision punched and oriented through-holes and contours as required. In order to provide these secondary operations, however, the overall machining process must be interrupted, whereby the punched component or sheet must be relocated to a separate secondary machining facility subsequent to the initial punching operation. Continuity of production is disrupted as a result of this physical relocation of the unfinished sheet material workpiece, thereby compromising production efficiency. Furthermore, the workpiece is subjected to cumulative gauging and machining errors resulting from a necessary repositioning of the workpiece in a second clamping and positioning device. Finally, redundant and costly secondary machining equipment is required to perform those machining operations previously described, according to the prior art.

SUMMARY OF THE INVENTION

In view of the foregoing, it is an object of the present invention to provide a method of and an apparatus for efficiently and accurately machining punched holes and contours formed in large sheet material by the punches carried by a turret punch press.

It is another object of the present invention to provide a method of and an apparatus for secondary machining of the rough and otherwise unfinished edges of the punched holes and contours formed in large sheet material by the punches carried by a turret punch press without requiring removal of the sheet material from the punch press prior to such secondary machining operation.

It is a further object of the present invention to provide a cutting tool, such as a milling tool, which is supported by the turret of a punch press for enabling a secondary machining operation to a sheet workpiece without requiring its relocation to a separate machining facility.

It is yet another object of the present invention to provide an integrated turret punch press capable of providing progressive machining operations to a sheet workpiece without requiring its relocation to separate and additional machining facilities.

These and other objects are accomplished according to the present invention by providing an air motor powered milling tool supported in the upper turret of a punch press for machining the rough and otherwise unfinished edges of punched holes or contours in metal sheet material. According to one embodiment of the invention, the air powered motor drives an end mill which is contained within and coaxially extends through a guide sleeve of the milling tool. The milling tool has an upper punch head portion and a lower guide sleeve portion maintained in coaxial alignment by a concentric hold-down spring disposed in an annular recess formed between the upper and lower portions. A plurality of hold-down bearings is disposed at the end of the guide sleeve adjacent the sheet material. A spring-biased lifter disposed in the upper turret is engagable with the guide sleeve.

According to another embodiment of the invention, a punch head/punch body assembly houses an air-powered motor. The motor drives an end mill which coaxially extends through a bore provided in the punch body, and then through a punch sleeve. The punch head/punch body assembly and the punch sleeve are maintained in coaxial alignment by an axially-extending reduced diameter portion of the punch body which slideably engages with a corresponding bore in the punch sleeve. An eccentrically located hold-down spring is disposed between and biases the punch body and the punch sleeve away from each other. A plurality of hold-down bearings is disposed at the end of the punch sleeve adjacent the sheet material. A spring-biased lifter disposed in the upper turret is engageable with the punch body.

In operation, a mechanically- or hydraulically-operated punch press striker impacts a corresponding surface of the punch head of the milling tool of either embodiment, urging the milling tool in the direction of the sheet material until the hold-down bearings directly contact and support the sheet material against a die carried by the lower turret. The downward movement of the milling tool causes a downward compression of the spring-biased lifter which is sized to yield before the hold-down spring. Concurrently, the striker is sealingly engaged with the corresponding top surface of the punch head and a compressed air charge is conducted through the striker into the milling tool and delivered to the air motor which drives the milling tool such as a rotatable end mill. Further downward pressure by the striker causes additional downward motion of the punch head and the air motor of the first embodiment, or of the punch head/punch body and air motor of the second embodiment, simultaneously resulting in an axial compression of the hold-down spring and causing the end mill to extend through the guide sleeve of the first embodiment, or through the punch sleeve of the second embodiment, to cut the sheet material in the desired machining operation.

Following sheet material machining and exhaustion of the compressed air charge the ram is reciprocated to its initial idle position causing the released hold-down spring to urge the punch head or punch head/punch body assembly to also return to its initial idle position. Simultaneously, the released lifter urges the guide sleeve, or the punch sleeve, in an upward direction toward its respective initial idle position. The upward release of the punch head or punch head/punch body assembly causes the end mill to retract into the guide sleeve or punch sleeve, respectively.

The hydraulically- or mechanically-driven ram striker and pneumatically-driven milling tool motor are controlled by a numerical controller or computer designed to operate the system in cooperation with the punching operations being concurrently performed on the punch press. A vacuum source is provided for removing chips and milling debris from the immediate work area.

These and other objects, features, and advantages of the present invention will be more apparent in the following description of a preferred embodiment taken in conjunction with the accompanying drawings.

DETAILED DESCRIPTION OF THE INVENTION

Figure 1:
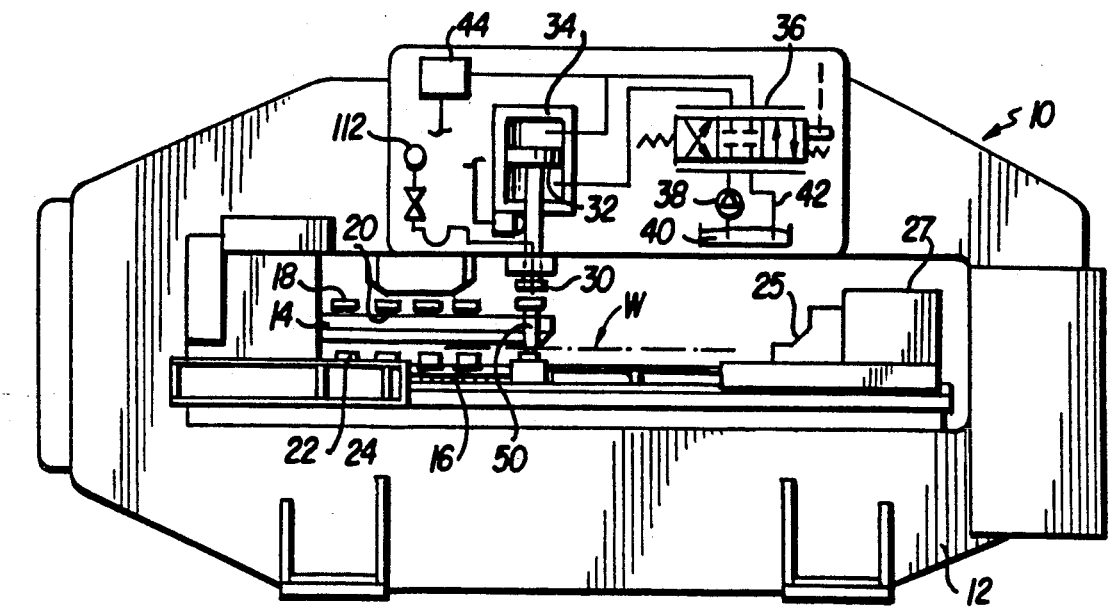
FIG. 1 is a schematic elevation view of a turret punch press provided with an air-powered milling tool of the present invention.

Referring to FIG. 1, a turret punch press 10 is shown as an example of a punch press which supports a plurality of punch tools as is known in the related art. The kind of turret punch press shown is well known and carries a plurality of tools which are actuated by a hydraulically- or mechanically-driven striker.

The turret punch press 10 has a support frame 12. On the frame 12, an upper turret 14 and a lower turret 16 are rotatably supported. On the upper turret 14, each of a plurality of punch tools 18 are detachably supported by a corresponding punch tool holder 20 so as to be lined up in circumferential and radial directions of the upper turret 14. On the lower turret 16, a plurality of dies 22 each corresponding to one of the punches 18 is detachably supported by a corresponding die holder 24. A sheet material workpiece W is clamped into horizontal position between the upper turret 14 and the lower turret 16 by clamps 25 carried by a carriage 27 which enables movement of the workpiece W in the X axis and Y axis directions.

A striker 30 for striking the punches 18 is so provided on the frame 12 as freely necessary to allow for reciprocation in a vertical direction and also as to be movable in radial direction of the upper turret 14 so that it can strike the punches 18 installed at different positions in a radial direction of the upper turret 14. The striker 30 is driven in a vertical direction toward the workpiece W by a hydraulically-driven ram piston 32 housed in a ram cylinder 34. The ram piston 32 is driven by hydraulic circuitry comprising a hydraulic pump 36, a servo valve 38, a hydraulic fluid reservoir 40, and a plurality of hydraulic fluid conveying conduits 42 in fluid communication therebetween. Location and pressure sensors (not shown) detect the position of the ram piston 32 and operating pressure inside the conduits 42. This information is conveyed to a system controller 44 which evaluates these and other inputs, as will be more fully described below.

Figure 2A:
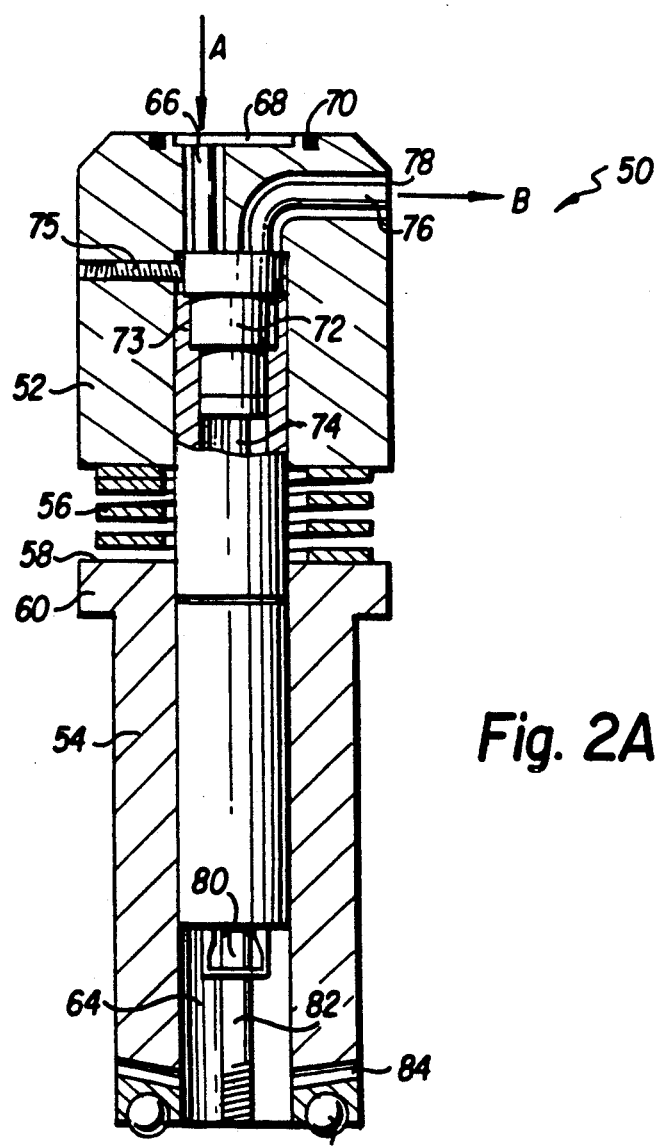
FIG. 2A is a cross-sectional view of a first embodiment of the air-powered milling tool, partly broken away.

FIG. 2A shows a cross-sectional view, partly broken away, of a first embodiment of the pneumatic milling tool 50 of the present invention. The milling tool 50 of the first embodiment comprises a punch head portion 52 and a guide sleeve portion 54 which are maintained in spaced coaxial alignment by a concentric hold-down spring 56 disposed in an annular recess in the tool 50. The guide sleeve 54, which has a radially outwardly extending flange 60 provided at the axially upper surface thereof, is configured to be removably supported in any of the punch holders 20 of the upper turret 14.

A plurality of hold down bearings 62 are located at the bottom end of the guide sleeve 54 adjacent the workpiece W and are configured to engage and locally secure the workpiece W between the milling tool 50 and the lower turret 16 during the milling operation.

A bore 64 extends through the guide sleeve 54 to an axially intermediate location of the punch head 52. An air conduit 66 in fluid communication with the bore 64 at the intermediate location opens to an air inlet 68 disposed in the upper surface of the punch head 52. An O-ring seal 70 is disposed in a correspondingly shaped groove formed concentrically about the air inlet 68 at a radially intermediate location on the axially upper surface of the punch head 52.

A fluid-powered motor, such as an air motor 72, of a type which is well known in the art, is supported within the punch head 52 by means of a stepped bushing 73 mounted within the bore 64. The air motor 72 is fixed in position by a set screw 75 which extends through the punch head 52. The air motor 72 includes a rotatable driveshaft 74 which extends coaxially through the bore 64 in the direction of the workpiece W. A working fluid such as compressed air shown as airflow A is provided to the motor 72 through the air conduit 66, and a discharge airflow B is vented through a discharge conduit 76 which opens to an air outlet 78 disposed in the periphery of the punch head 52. A chuck 80 is mounted to the free end of the drive shaft 74, to which an appropriately sized and configured cutting tool, such as end mill 82, is securely affixed. Those skilled in the art will appreciate that a hydraulic fluid-powered motor could be used in lieu of the air-powered motor and cutting tools other than milling tools may be used.

Figure 2B:
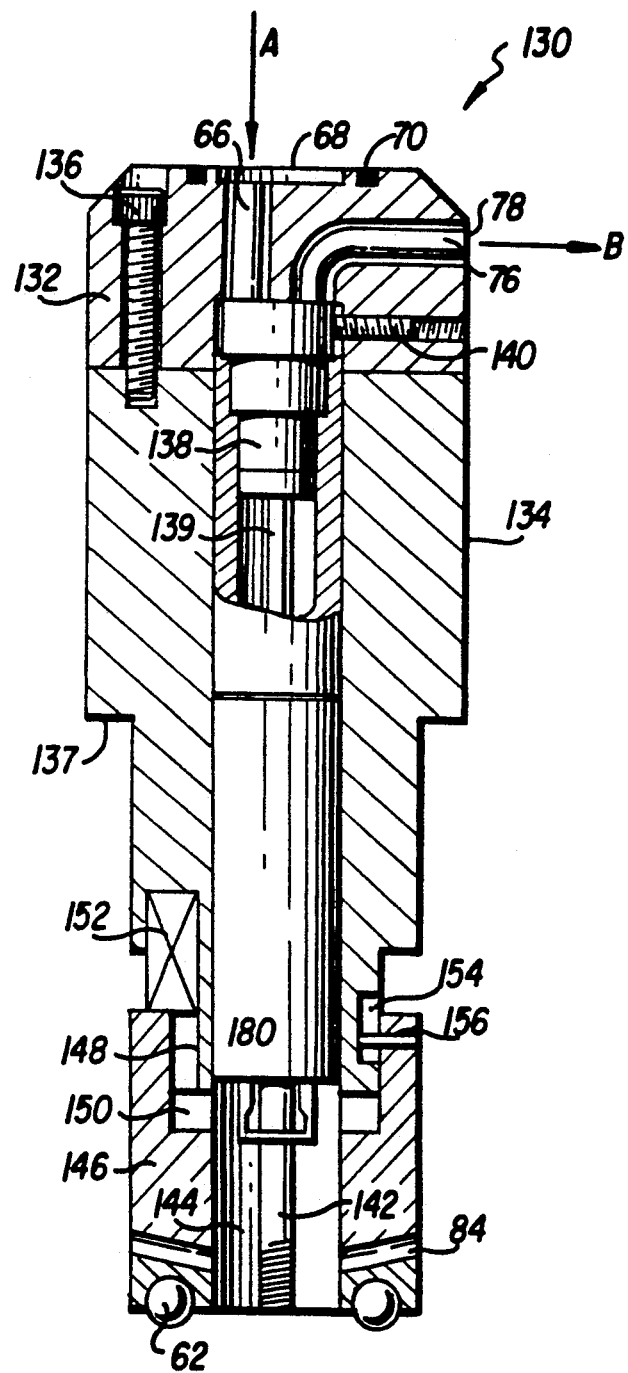
FIG. 2B is a cross-sectional view of a second embodiment of the air-powered milling tool, partly broken away.

FIG. 2B shows a cross-sectional view, partly broken away of a second embodiment of the pneumatic milling tool 130 of the present invention. The milling tool 130 of the second embodiment comprises a punch head 132 removably affixed to a punch body 134 by a plurality of screws 136 (only one shown). The punch head 132 houses a fluid-powered motor such as an air-powered motor 138. The air motor 138 is fixed in position by a set screw 140 which extends through the punch head 132. The punch body 134, which has an annular shoulder 137 provided at an axially intermediate location thereof, is configured to be removably supported in any of the punch holders 20 of the upper turret 14.

The air motor 138 includes a rotatable driveshaft 139 which drives an end mill 142. The end mill 142 extends coaxially through a bore 144 provided in a punch sleeve 146 which provides an axial extension of the punch body 134 in the direction of the workpiece W. The punch body 134 and the punch sleeve 146 are maintained in coaxial alignment by a reduced diameter portion 148 of the punch body 134 which slidably engages with a corresponding bore 150 disposed in the punch sleeve 146 coaxially with bore 144. The punch body 134 is biased away from the punch sleeve 146 by an eccentrically-located hold-down spring 152 disposed between the punch body 134 and the punch sleeve 146.

An axially extending slot 154 is provided in the reduced diameter portion 148 of the punch body 134. A pin 156 passing through the upper-annular portion of punch sleeve 146 extends into the slot 154. Axial extension/compression of the punch sleeve 146 relative to the punch body 134 is thus limited by the axial length of the slot 154.

Figure 3C:
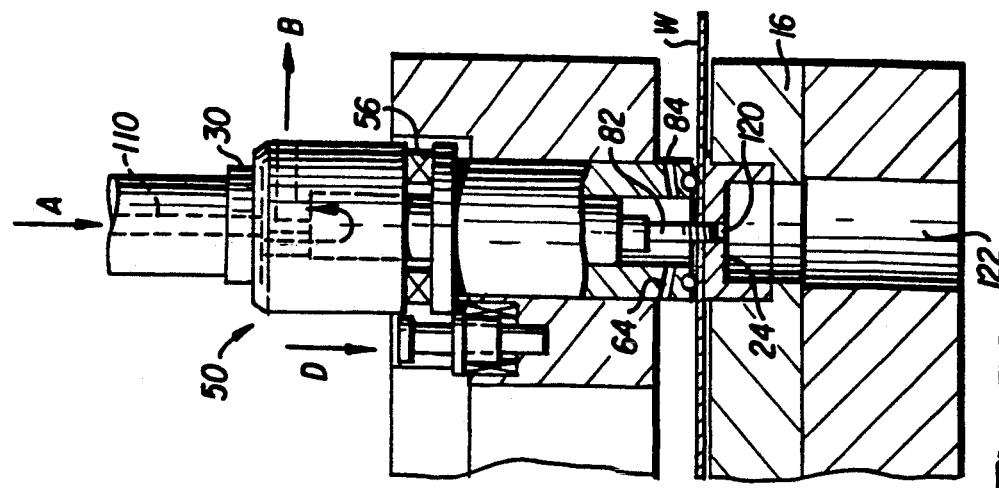
FIG. 3C is a cross-sectional view of the milling tool of the first embodiment in an extended position after cutting through a sheet workpiece during the milling operation.
Figure 3B:
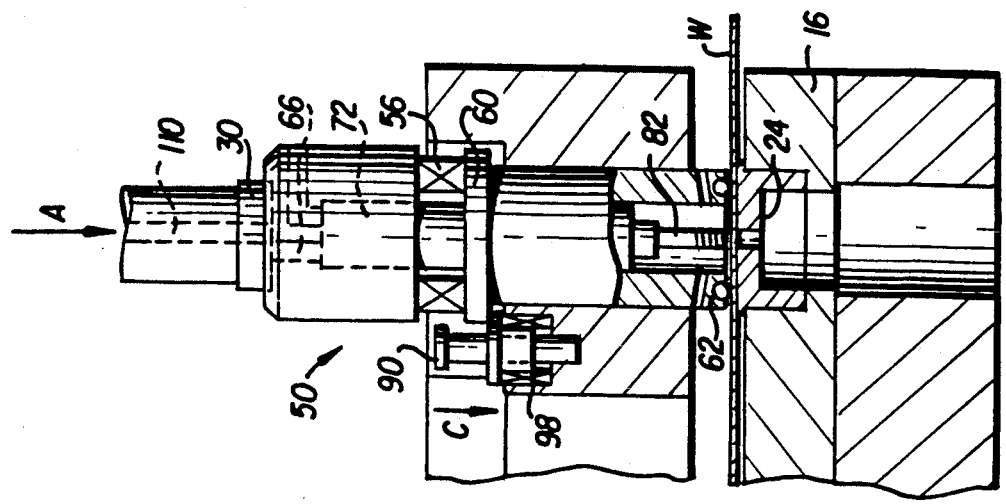
FIG. 3B is a cross-sectional view of the milling tool of the first embodiment, showing the punch press striker impacting the punch head of the milling tool prior to the milling operation.
Figure 3A:
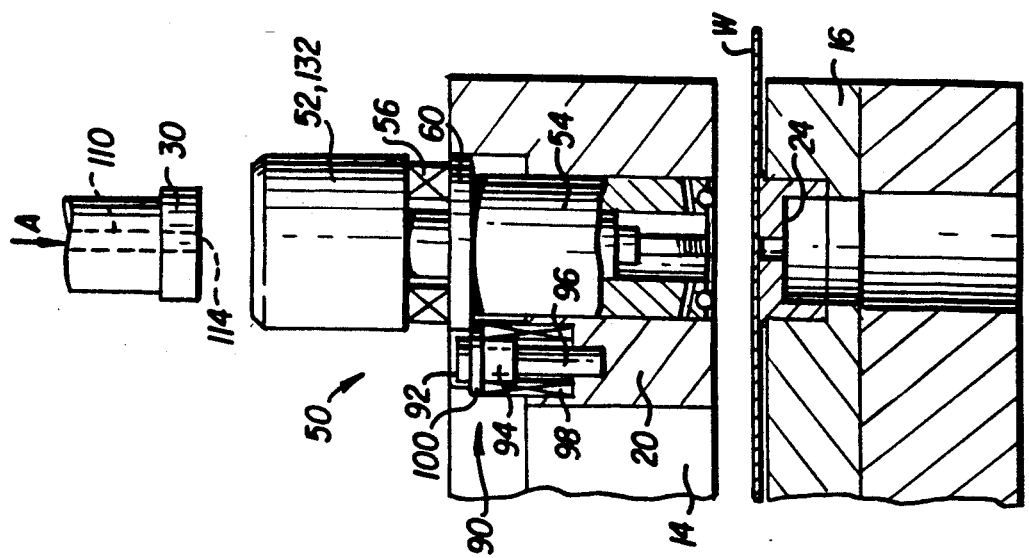
FIG. 3A is a cross-sectional view of the milling tool of the first embodiment supported in a punch holder of the upper turret of the punch press, prior to a milling operation.

FIG. 3A shows a cross-sectional view, partly broken away, of the milling tool 50 being carried by a punch holder 20 of the upper turret 14. A spring-biased lifter device 90 is supported in a recess 92 of the upper turret 14 adjacent the upper end of the guide sleeve 54. The lifter device 90 includes a shaped piston 94 in slidable engagement with a piston shaft 96 which is in substantially parallel alignment with the major axis of the milling tool 50. The piston 94, which is biased in a vertically upward direction by a piston spring 98 disposed adjacent the shaft 96, is also provided with a shoulder 100 which is configured to engage with the flange 60 of the guide sleeve 54. The recess 92 may be configured to limit the extent of the downward path of the piston 94 or of the shoulder 100. Alternatively, the spring 98 of the piston 52 may be sized as necessary to provide such a limiting function. The hold-down spring 56 which separates the punch head 52 from the guide sleeve 54 has a greater spring constant than the piston spring 98, as will become hereinafter apparent.

A passageway 110 for flowing compressed air from a compressed air source 112 (FIG. 1) is provided in the striker 30 and opens at an outlet 114 disposed at the distal end of the striker 30. The compressed air source 112 generally includes a dry air source, an air filter, a solenoid valve, and airflow conduits in communication with the striker passageway 110. The solenoid valve (not shown), which is operatively connected to the system controller 44 is enabled by the controller 44 to selectively direct either a steady flow or discrete charges of airflow A into the passageway 110. An air volume of nine cubic feet per minute generated by a fifteen horsepower dry clutch machine or a three horsepower wet clutch machine has been found to adequately provide required system air pressure in the range of 71–100 pounds per square inch. Optionally, the compressed air source 112 may be supplemented with an oil misting system (not shown) in an in-line delivery arrangement. The oil misting system includes an injection apparatus and an oil reservoir (both not shown). The oil reservoir has a holding capacity of about 61 cubic inches of ISO No. VG 32 type oil or equivalent. An oil delivery rate of about 0.0012 cubic inch per stroke of the striker 30 provides sufficient oil mist delivery for approximately 50,000 strokes.

The compressed airflow A is then directed through the striker 30 and toward the punch head 52 when the striker 30 approaches and contacts the punch head 52, 132 during operation of the system. More particularly, the O-ring seal 70 disposed at the top surface of the punch head 52 sealingly engages with the corresponding distal end of the striker 30 and directs the compressed air flowing from the striker outlet 114 to the punch head air inlet 68 when the striker 30 has reached the maximum extent of its downward stroke. It is in this condition that a compressed air charge or substantially steady state airflow A is delivered to the air motor 72 of the pneumatic milling tool 50. The compressed air charge or airflow A powers the motor 72 to rotate the coaxially aligned end mill 82 (or other compatible secondary machining apparatus). When idle, the tip of the end mill 82 is even with, or retracted from, the end of the guide sleeve 54. It will become evident to one skilled in the art to which this invention pertains that other machining devices may be supported by the chuck 80 and impacted against the workpiece W to accomplish a desired machining operation.

The staged operation of the system will now be described with particular reference to FIGS. 3A-3C. According to the invention, the milling tool 50 is removably supported by any selected punch holder 20, as shown in FIG. 3A. According to the first embodiment 50 and as seen in FIG. 3B, when the striker 30 descends to contact the milling tool 50, the milling tool 50 is directed towards the workpiece W until the hold down bearings 62 securely engage the top surface of the workpiece W, thereby pressing the workpiece W against a die holder 24 carried by the lower turret 16. Simultaneously, the lifter device 90 is compressed vertically downward in the direction of arrow C by the corresponding downward motion of guide sleeve flange 60. Because the spring constant of the hold-down spring 56 is greater than the spring constant of the lifter spring 98, the initial downward stroke of milling tool 50 causes an initial compression of the lifter spring 98 prior to compression of the hold-down spring 56. A partial or complete compression of the lifter spring 98 is accomplished prior to initial compression of the hold-down spring 56, depending on desired stroke characteristics of the system and sizing of the springs 56, 98. During this initial downward stroke, the air flow A is simultaneously flowed through the striker 30 and then through the milling tool 50 to cause rotation of the endmill 82 by the air motor 72. Preferably, the endmill 82 will have developed sufficient torque and speed necessary to prevent binding upon initial contact with the workpiece W, as shown in FIG. 3B.

As seen in FIG. 3C, subsequent downward movement of the striker 30 against the punch head 52 causes compression of the hold-down spring 56 in the direction of arrow D, resulting in extension of the endmill 82 from the guide sleeve 54 and subsequent machining of the workpiece W. During machining, the end mill 82 may project into a through hole 120 disposed in the die holder 24.

In order to provide for removal of chips and other machining debris during the milling operation, a vacuum source (not shown) may be connected to an opening 122 formed in the lower turret 16. The opening 122 communicates with the through hole 120 which, in turn, communicates with a pair of ports 84 formed in the lower end of the guide sleeve 54. Air drawn into the bore 64 through the ports 84 by the vacuum source thus carries the machining debris down through the opening 122.

Following exhaustion of the compressed air charge or cessation of the airflow A by computer control, the striker 30 is reciprocated to its retracted idle position. The punch head 52 is driven upward by the released hold-down spring 56, causing the end mill 82 to retract into the guide sleeve 54. Finally, the lifter device 90 drives the guide sleeve 54 upward to its idle position.

Operation of the second embodiment of the milling tool 130 is substantially similar to the operation of the first embodiment 50 with reference to FIGS. 3A, 3B, and 3C, as follows. According to the invention, when the striker 30 descends to contact the milling tool 130, the milling tool 130 is directed towards the workpiece W until the hold-down bearings 62 securely engage the top surface of the workpiece W against a die holder 24 carried by the lower turret 16. Simultaneously, the lifter device 90 is compressed vertically downward in the direction of arrow C by the corresponding downward motion of the annular shoulder 137. Because the spring constant of the hold-down spring 152 is greater than the spring constant of the lifter spring 98, the initial downward stroke of milling tool 130 causes an initial compression of the lifter spring 98 prior to compression of the hold-down spring 152. A partial or complete compression of the lifter spring 98 is accomplished prior to initial compression of the hold-down spring 152, depending on desired stroke characteristics of the system and sizing of the springs 152, 98. During this initial downward stroke, the airflow A is simultaneously flowed through the striker 30 and then through the milling tool 130 to cause rotation of the endmill 142 by the air motor 138 acting through the driveshaft 139. Preferably, the endmill 142 will have developed sufficient torque and speed necessary to prevent binding upon initial contact with the workpiece W, as shown in FIG. 3B.

Subsequent downward movement of the striker 30 against the punch head 132 causes compression of the hold-down spring 152, resulting in extension of the endmill 142 from the punch sleeve 146 and subsequent machining of the workpiece W. Downward compression of the hold-down spring 152 is limited to the extent of the axial length of the slot 154 when the pin 156 is simultaneously engaged with the slot 154 and the punch sleeve 146. Accordingly, the amount of travel of the pin 156 within the slot 154 enables a corresponding length of "slack" or run-out by the punch sleeve 146 when the assembled punch head/punch body assembly 132, 134 is initially driven toward the workpiece W. This feature enables, for example, final positioning of the workpiece W prior to the application of the full, downward force of the milling tool 130, via the hold-down bearings 62, to the workpiece W.

Following exhaustion of the compressed air charge or cessation of the airflow A by computer control, the striker 30 is reciprocated to its retracted idle position. The punch head/punch body assembly 132, 134 is driven upward by the released hold-down spring 152, causing the endmill 142 to retract into the punch sleeve 146. Subsequently, the lifter device 90 further drives the assembled punch head/punch body 132, 134 in an upward direction toward its idle position. As the lifter device 90 is initially driven upward, the pin 156 travels downward relative to the slot 154 until all slack in the slot 154 has been taken up. Additional upward motion of the lifter device 90 then causes the assembled punch head/punch body 132, 134 and punch sleeve 146 to complete the retraction cycle in tandem.

The system controller 44, such as a numerically controlled device, or CNC, controls the sequential timing of the servo valve 38, the striker 30, the workpiece W positioning device, and the turrets 14, 16. The controller 44 comprises a CNC data input section, a main control section, a position detection section, and a servo valve control section. The CNC data input section is connected with, for example, a CAD/CAM device and provides numerical control data for control of the turret punch press, hydraulic system, and pneumatic system.

The main control section mainly controls the position of the workpiece W and the hydraulic cylinder piston 32 which activates the striker 30. The position detection section is connected to a variety of position sensors and limit switches (not shown). The servo control valve control section provides interactive control over the various fluid delivery systems in combination with the aforementioned control and detection sections.

Although certain preferred embodiments of the invention has been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and applicable rules of law.

I claim:

1. A tool for use with a turret punch press having a rotatable turret provided with a plurality of tool holders, said tool adapted to be mounted in one said tool holders and including a fluid-powered motor for driving a cutting tool mounted thereto, a striker adapted to be urged against said tool, and means for flowing a fluid supply through said striker and to said motor when the turret is rotated to a predetermined position.

2. The tool as defined in claim 1, the turret punch press including a striking position, and wherein said predetermined position is at said striking position.

3. The tool as defined in claim 2, wherein said cutting tool is operatively engaged with said fluid-powered motor at said striking position, said cutting tool being directed against a workpiece disposed in opposing relationship thereto.

4. The tool as defined in claim 1, wherein said fluid supply is compressed air.

5. The tool as defined in claim 1, wherein said cutting tool is a milling tool.

6. A tool for use with a turret punch press having a rotatable turret provided with a plurality of tool holders, said tool adapted to be mounted in one of said tool holders and including a fluid-powered motor for driving a cutting tool mounted thereto, and means for coupling a fluid supply to said motor when the turret is rotated to a predetermined position, said tool further including a guide sleeve mounted in said one tool holder and having a through bore, a punch head having a bore substantially coaxial with the bore in said guide sleeve and being supported for axial movement relative to said guide sleeve, said motor and cutting tool being mounted in the bore of said punch head for slidable axial movement in the bore of said guide sleeve and means for resiliently biasing said guide sleeve and said punch head away from each other whereby said guide sleeve and said punch head are urged toward one another against the force of said resilient biasing means, said cutting tool projecting out of the bore at one end of said guide sleeve for engaging a workpiece.

7. The tool as defined in claim 6, wherein said cutting tool is a milling tool.

8. The tool as defined in claim 6, wherein said fluid supply coupling means comprises an air inlet in said punch head for directing a working fluid to said motor and including an air exhaust outlet in said punch head for venting the working fluid from said motor.

9. The tool as defined in claim 8, wherein said working fluid is compressed air.

10. The tool as claimed in claim 6, wherein said resilient biasing means comprises a spring concentrically disposed between said punch head and said guide sleeve.

11. The tool as claimed in claim 6, further comprising a plurality of spaced apart hold down bearings affixed to said one end of the guide sleeve.

12. A turret punch press for machining a sheet metal workpiece, comprising:
a frame;
a striker supported on said frame;
a turret rotatably mounted on said frame and having a plurality of tool holders;
means for rotating said turret to position a selected one of said tool holders in a striking position in opposing relation to said striker; and
a tool adapted to be mounted in one of said tool holders, said tool comprising a fluid-powered motor for driving a cutting tool mounted thereto, and means for flowing a fluid supply through said striker and to said motor when said turret is rotated to said striking position and when said striker is urged against said tool.

13. The turret punch press as defined in claim 12, wherein said fluid supply is compressed air.

14. The turret punch press as defined in claim 12, wherein said cutting tool is a milling tool.

15. A turret punch press for machining a sheet metal workpiece, comprising:
a frame;
a striker supported on said frame;
a turret rotatably mounted on said frame and having a plurality of tool holders;
means for rotating said turret to position a selected one of said tool holders in a striking position in opposing relation to said striker; and
a tool adapted to be mounted in one of said tool holders, said tool comprising a fluid-powered motor for driving a cutting tool mounted thereto, and means for coupling a fluid supply to said motor when said turret is rotated to said striking position;
said tool further including a guide sleeve mounted in said one tool holder and having a through bore, a punch head having a bore substantially coaxial with the bore in said guide sleeve and being supported for axial movement relative to said guide sleeve, said motor and cutting tool being mounted in the bore of said punch head for slidable axial movement in the bore of said guide sleeve and means for resiliently biasing said guide sleeve and said punch head away from each other whereby when said guide sleeve and said punch head are urged toward one another against the force of said resilient biasing means, said cutting tool projects out of the bore at one end of said guide sleeve for engaging the workpiece.

16. The turret punch press as defined in claim 15, wherein said fluid supply coupling means comprises an air inlet in said punch head for directing a working fluid to said motor and including an air exhaust outlet in said punch head for venting the working fluid from said motor.

17. The turret punch press as defined in claim 15, wherein said resilient biasing means comprises a spring concentrically disposed between said punch head and said guide sleeve.

18. The turret punch as defined in claim 15, further comprising a plurality of spaced apart hold down bearings affixed to said one end of the guide sleeve.

19. A turret metal punch press for machining a sheet metal workpiece, comprising:
a frame;
a striker supported on said frame;
a turret rotatably mounted on said frame and having a plurality of tool holders;
means for rotating said turret to position a selected one of said tool holders in a striking position in opposing relation to said striker;
a secondary machining tool mounted in one of said tool holders, said tool comprising a fluid-powered motor for driving a cutting tool operatively connected to said motor, said tool including a fluid inlet for receiving a working fluid to drive said motor; and
said striker including a fluid outlet for supplying the working fluid to said fluid inlet when said tool is positioned in said striking position.

20. The turret punch press as defined in claim 19, wherein said working fluid is air and said cutting tool is a milling tool.

21. The turret punch press as defined in claim 19, including means mounted on said frame for urging a striking surface of said striker on opposing surface of said tool when said tool is positioned in said striking position and means for forming a seal between said surfaces when said surfaces contact one another whereby fluid flow is permitted between the fluid outlet of said striker and the fluid inlet of said tool.

22. The turret punch press as defined in claim 21, wherein said seal forming means comprises an O-ring.

23. A tool for use with a turret punch press having a rotatable turret provided with a plurality of tool holders, said tool adapted to be mounted in one of said tool holders and including a fluid-powered motor for driving a cutting tool mounted thereto, and means for coupling a fluid supply to said motor when the turret is rotated to a predetermined position, said tool further including a punch body mounted in said one tool holder and having a through bore, a punch head mounted to said punch body having a bore substantially coaxial with the bore in said punch body, a punch sleeve having a bore substantially coaxial with the through bore of the punch body and being supported for axial movement relative to said punch body, said motor and cutting tool being mounted in the bore of said punch head for slidable axial movement in the bore of said punch sleeve and means for resiliently biasing said punch sleeve and said punch body away from each other;
whereby when said punch sleeve and said punch body are urged toward one another against the force of said resilient biasing means, said cutting tool projects out of the bore at one end of said punch sleeve for engaging a workpiece.

24. The tool as defined in claim 23, wherein said cutting tool is a milling tool.

25. The tool as defined in claim 23, wherein said fluid supply coupling means comprises an air inlet in said punch head for directing a working fluid to said motor and including an air exhaust outlet in said punch head for venting the working fluid from said motor.

26. The tool as defined in claim 25, wherein said working fluid is compressed air.

27. The tool as claimed in claim 23, wherein said resilient biasing means comprises a spring eccentrically disposed between said punch body and said punch sleeve.

28. The tool as claimed in claim 23, further comprising a plurality of spaced apart hold down bearings affixed to said one end of the guide sleeve.

29. The tool as claimed in claim 23, wherein said punch body includes a substantially axially-aligned slot disposed in an outer periphery thereof, and a pin projected through said punch sleeve to slidingly engage said slot.

30. A turret punch press for machining a sheet metal workpiece, comprising:
a frame;
a striker supported on said frame;
a turret rotatably mounted on said frame and having a plurality of tool holders;
means for rotating said turret to position a selected one of said tool holders in a striking position in opposing relation to said striker; and
a tool adapted to be mounted in one of said tool holders, said tool comprising a fluid-powered motor for driving a cutting tool mounted thereto, and means for coupling a fluid supply to said motor when said turret is rotated to said striking position;
said tool further including a punch body mounted in said one tool holder and having a through bore, a punch head mounted to said punch body having a bore substantially coaxial with the bore in said punch body, a punch sleeve having a bore substantially coaxial with the through bore of the punch body and being supported for axial movement relative to said punch body, said motor and cutting tool being mounted in the bore of said punch head for slidable axial movement in the bore of said punch sleeve and means for resiliently biasing said punch sleeve and said punch body away from each other;
whereby when said punch sleeve and said punch body are urged toward one another against the force of said resilient biasing means, said cutting tool projects out of the bore at one end of said punch sleeve for engaging the workpiece.

31. The turret punch press as defined in claim 30, wherein said fluid supply coupling means comprises an air inlet in said punch head for directing a working fluid to said motor and including an air exhaust outlet in said punch head for venting the working fluid from said motor.

32. The turret punch press as defined in claim 30, wherein said resilient biasing means comprises a spring eccentrically disposed between said punch body and said punch sleeve.

33. The turret punch press as defined in claim 30, further comprising a plurality of spaced apart hold down bearings affixed to said one end of the guide sleeve.

34. The turret punch press as defined in claim 30, wherein said punch body includes a substantially axially-aligned slot disposed in an outer periphery thereof, and a pin projected through said punch sleeve to slidingly engage said slot.

35. The tool as defined in claim 6, the turret punch press including a striking position, wherein said predetermined position is at said striking position, and wherein said cutting tool is operatively engaged with said fluid-powered motor at said striking position, said cutting tool being directed against the workpiece disposed in opposing relationship thereto.

36. The turret punch press as defined in claim 15, wherein said fluid supply is compressed air, and wherein said cutting tool is a milling tool.

37. The tool as defined in claim 23, the turret punch press including a striking position, wherein said predetermined position is at said striking position, and wherein said cutting tool is operatively engaged with said fluid-powered motor at said striking position, said cutting tool being directed against the workpiece disposed in opposing relationship thereto.

38. The turret punch press as defined in claim 30, wherein said fluid supply is compressed air, and wherein said cutting tool is a milling tool.

39. A tool for use with a turret punch press having a turret rotatable to a plurality of positions, said turret having a plurality of tool holders, said tool adapted to be mounted in one of said tool holders and including a fluid-powered motor for driving a cutting tool mounted thereto, and means provided at one of said positions for selectively connecting and disconnecting a fluid supply to said motor to impart a rotary motion to said tool.

40. The tool as defined in claim 39, wherein said fluid supply is flowed to said motor when the turret is rotated to a predetermined position.

41. The tool as defined in claim 39, further including a guide sleeve mounted in one said tool holder for supporting the tool for axial movement, and means for resiliently biasing said tool against said guide sleeve.

42. The tool as defined in claim 39, wherein said fluid supply is compressed air and said cutting tool is a milling tool.

43. A turret punch press for machining a sheet metal workpiece, comprising:
   a frame;
   a striker supported on said frame;
   a turret rotatably mounted on said frame and having a plurality of tool holders;
   means for rotating said turret to a plurality of positions to position a selected one of said tool holders in a striking position beneath said striker; and
   a cutting tool adapted to be mounted in one of said tool holders, said cutting tool including a fluid-powered motor for imparting rotary motion thereto, and means provided at one of said positions for selectively connecting and disconnecting a fluid supply to said motor.

44. The turret punch press as defined in claim 43, wherein said fluid supply is flowed to said motor when the turret is rotated to a predetermined position.

45. The turret punch press as defined in claim 43, wherein said fluid supply is compressed air and said cutting tool is a milling tool.

46. A tool for use with a turret punch press having a rotatable turret provided with a plurality of tool holders, said tool adapted to be mounted in one of said tool holders and including a fluid-powered motor for driving a cutting tool mounted thereto, means for flowing a fluid supply to said motor to impart a rotary motion to said tool, a guide sleeve mounted in one said tool holder for supporting the tool for axial movement, and means for resiliently biasing said tool against said guide sleeve.

* * * * *